United States Patent [19]

Wascher et al.

[11] Patent Number: 5,491,546
[45] Date of Patent: Feb. 13, 1996

[54] LASER ASSISTED TELESCOPIC TARGET SIGHTING SYSTEM AND METHOD

[76] Inventors: Rick R. Wascher, P.O. Box 198468, Nashville, Tenn. 37219; Ray Fairbanks, Jr., 1806 E. Main St., Murfreesboro, Tenn. 37130; Roy L. Neuhauser, III, P.O. Box 10613, Knoxville, Tenn. 37939

[21] Appl. No.: 197,649

[22] Filed: Feb. 17, 1994

[51] Int. Cl.$^6$ .............................. G01C 3/08; G01C 3/10; F41G 1/38; F41G 1/34
[52] U.S. Cl. .............................. 356/4.03; 33/245; 42/103; 356/3; 356/8; 356/20
[58] Field of Search .................... 356/1, 4, 8, 20, 356/3, 4.03; 354/403; 42/103; 33/245

[56] References Cited

U.S. PATENT DOCUMENTS

| | | | |
|---|---|---|---|
| 3,617,128 | 11/1971 | Harvey | 356/4.03 |
| 3,682,552 | 8/1972 | Hartman | 356/3 |
| 4,787,739 | 11/1988 | Gregory | 356/4 |
| 4,801,201 | 1/1989 | Eichweber | 356/4.03 |
| 5,194,734 | 3/1993 | Whittaker | 356/1 |
| 5,368,392 | 11/1994 | Hollander et al. | 374/121 |

*Primary Examiner*—Stephen C. Buczinski
*Attorney, Agent, or Firm*—Rick R. Wascher

[57] ABSTRACT

The present invention is directed to a laser assisted telescopic targeting system, apparatus and method of range finding and aiming a projectile firing weapon. The invention includes a laser light generating source capable of producing a spot of laser light on a target. The invention also includes a shooting scope to view the target. The shooting scope preferably has indicia or a shutter for measuring the approximate size of the laser dot projected on the target. Based upon the size of the spot and the growth rate of the laser targeting source the user can determine, with a substantial degree of accuracy, the relative distance from the target. The method includes steps associated with using the inventive apparatus and system and aiming a projectile firing weapon depending upon the information obtained.

22 Claims, 4 Drawing Sheets

LASER ASSISTED TELESCOPIC TARGET SIGHTING SYSTEM AND METHOD

BACKGROUND OF THE INVENTION

1. Field of the Invention

The present invention relates generally to laser sighting devices and telescopic sighting devices, such as laser aiming devices and shooting scopes respectively, useable with a projectile firing device or firearm.

2. Description of Related Art

The art to which the invention relates includes firearm scopes such as riflescopes, handgun scopes and archery scopes, hereinafter "shooting scopes", used to provide the shooter with an enlarged or otherwise enhanced image or field of view of a distant target.

Virtually all shooting scopes, except for most archery scopes, are "refracting" telescopes. Refracting telescopes typically have two parts: the "objective," which is usually a lens, and the "eyepiece," which can be a single lens or group of lenses.

The objective and eyepiece are typically mounted within the confines of a substantially cylindrical tube referred to as a "scope tube." When the user looks through the eyepiece of the shooting scope he typically sees intersecting reticles or crosshairs, sighting posts, sighting rings, targeting spots, or the like, hereinafter referred to as "aiming indicia" superimposed on the distant object in the field of view of the scope. The aiming indicia is designed to provide the user with a point of reference indicating the intended the area of the target the projectile is to strike after it is fired from the weapon. The shooting scope may also include various adjustment knobs, associated with the scope tube, to provide the user with a means of adjusting the aiming indicia and thus his point of aim prior to firing the weapon to which it is attached. The means of fine adjustment is designed to allow the user to account for certain variables such as windage and projectile rise or drop.

There are primarily two types of riflescopes: (1) fixed power, and (2) variable power scopes. A fixed power scope has a constant magnification factor, and is substantially focused at any viewing range. Variable power scopes are believed to be more versatile as the magnification factor can be adjusted and while most also have a focus free construction, some may be focused to adjust for parallax. The field of view of fixed power scopes remains constant at a given distance; whereas, the field of view through a variable power scope at a fixed distance will change (i. e., decrease) when the magnification factor is increased.

The art to which the invention relates also includes laser pointing or laser aiming devices, but more particularly to devices for generating and projecting a laser beam at a distant target as opposed to optically superimposing a dot of constant size on a distant target, hereinafter "laser targeting means" or "laser targeting devices." For example, the laser targeting devices manufactured or sold by the following entities are believed to partially comprise the art to which the invention relates: Action Arms Ltd. of Philadelphia, Penn., ADCO International of Woburn., Massachusetts, AFKO Technologies Inc. of Irvine, Calif., Aimpoint EISA of Herndon, Va., Alpec Team of Danville, Calif., Applied Laser Systems of Grants Pass, Oregon, Aro-Tek Ltd. of Pacific, Wash., B-Square of Fort Worth, Tex., Bushnell/Bausch & Lomb Sports Optics of Overland Park, Kans., Gilmore Sports Concepts Inc. of Tulsa, Okla., Laser Devices of Monterey, Calif., Simmons Outdoor Corp. of Thomasville, Ga., TacStar Industries of Cottonwood, Ariz., and Tasco of Miami, Fla.

The laser beam generated by a laser targeting device is preferably collimated and is therefore capable of projecting a fine tightly confined beam of laser light, and thus a dot of laser light corresponding to the circumference of the beam, on the intended distant target. Of course, variations in the collimation may produce shapes other than dots, but dots are believed to be the most common and easy to produce.

Like most dots created by laser beams, the size of the dot of laser light projected by the laser targeting devices "grows" as the distance between the laser targeting devices and the target upon which the dot is projected increases. If the size of the laser dot and distance the laser targeting device is located from the target is plotted on a graph, the resulting growth rate would be substantially linear.

If the rate at which the spot of laser light grows is known, which is typically dependent upon the specific laser targeting device used, and the shooting scope can measure the size of the relative approximate spot size as it appears on a distant target, the relative distance the laser light source is from the target can be determined by extrapolation between known data points or reference to the graph.

For example, if the dot were one inch in diameter at one-hundred yards and two inches in diameter at two-hundred yards. Similarly, one could expect the diameter of the dot to be three inches at three-hundred yards, three and one-half inches at three-hundred fifty yards, and four inches at four-hundred yards. Similarly the dot would be larger at longer ranges, for example, ten inches at one-thousand yards.

Until now, a shooting scope and laser targeting system, designed to determine target distances by determining an approximate size of a laser dot projected on the distant target, has not been invented.

SUMMARY OF THE INVENTION

The present invention is directed to a laser assisted targeting sighting system, apparatus and method for use with a projectile firing weapon such as a firearm. The system includes a shooting scope, a laser light source or laser means for generating and projecting a beam of laser light on a distant target (the "laser targeting means" or "laser targeting device") enabling a spot of laser light to appear thereon. The system incorporates a measuring device or sizing means, preferably associated with the shooting scope, for measuring the size of the spot of laser light projected on the distant target by the laser targeting means or device.

The measuring device or sizing means of the present invention typically includes range finding aiming indicia such as shooting scope crosshairs, reticles, dots, hash marks, lines or the like superimposed by the shooting scope on the target at the laser spot. The aiming indicia are arranged is such a way as to enable the shooter to measure the approximate size of the projected laser dot and accurately estimate the distance from the target.

Of course, during daylight hours the laser spot may be difficult to see at great distances. The currently accepted industry standard for wavelength and thus brightness of laser light targeting devices of the aforementioned types is approximately six-hundred seventy nanometers (670 nm) wavelength that appears dim or not visible to the naked eye in bright sun.

To remedy this situation, the system also contemplates the inclusion of laser light enhancing glasses, for example of the type manufactured by Gilmore (referenced above) and marketed under the trademark VISION LEADER. A laser targeting device capable of generating 1g laser light easily visible in bright daylight, however, is preferred.

One such laser targeting device is a device marketed under the trademark "HotDot." The "HotDot" device is manufactured and sold by Emerging Technologies Inof Little Rock, Ark. The laser diode of the "HotDot" device operates at six-hundred thirty nanometers (630 nm) wavelength making the emergent laser light visible in bright sun.

After the shooter finds the target with the laser targeting device of the inventive system, the approximate distance the target is away from the laser targeting device can be determined by aligning the aiming indicia seen through the shooting scope with the dot of laser light as it appears on the target. The laser dot is visually placed within, or visually compared to the appropriate size of part of the superimposed aiming indicia (preferably a circle as will be described below) to accurately estimate the distance from the target. Of course, the aiming indicia are precalibrated to correspond with the growth rate of the particular laser targeting means or device used.

If, for example, the dot fills or is slightly larger than the one-thousand two-hundred yard circle and substantially smaller than the one-thousand three-hundred yard circle, the shooter can estimate the true shooter to target distance as between one-thousand two-hundred and one-thousand and three-hundred yards. After the relative distance is known, the shooter can account for the projectile drop or rise, e.g., bullet or arrow drop or rise, being fired and adjust his sight plane to account for the projectile drop over the distance calculated. Of course, the projectile flight characteristics of a given projectile must be known to make such an adjustment. The system, apparatus and method are particularly useful for enhancing the accuracy of long range shooting.

If, for example, the projectile firing weapon or firearm is "zeroed" for accuracy at two hundred yards and the distance is three-hundred fifty yards, and the shooter knows the bullet drop of the particular cartridge being fired is three inches during the projectile travel from two hundred to three hundred fifty yards, the shooter then aims approximately three inches above the zeroed in sight line. Indicia is also included within the preferred embodiment of the system described below to facilitate the shooter's approximation of the aforementioned three inches.

That is, an embodiment of the present invention also incorporates aiming indicia to provide the shooter with range adjusted zeroed crosshair sighting lines so the error associated with the step of approximating the aiming point of the non-zeroed three inches is minimized. In the aforementioned embodiment using circles, the shooting scope may, therefore, include several different aiming indicia resembling circles and crosshairs or hash marks.

In the alternative, the :measuring device or sizing means may include an automatic or manual dialable shutter or shutter means having an adjustable opening like that associated with a camera lens shutter. With this embodiment, if the user adjusts the size of the shutter opening to correspond with the size of the dot, for example by dialing a shutter ring like that commonly found on a lens of a 35 mm camera, the user may then read off the precalibrated shutter ring the approximate distance the shooter is from the target.

In an alternate embodiment, the user may also be allowed to view the target to shooter distance through the shooting scope so the shooter is not required to divert his gaze from the shooting scope and acquired target. Ideally, the shooting scope and the range finding function of the system are incorporated into a single component. With respect to the shutter embodiment, however, the range finding function may also be associated with the shutter, which in turn may simply be constructed in the form of a cover for attachment to the shooting scope. Similarly, the laser targeting device and shooting scope can be separate components, or they may be formed integral with one another in a single housing.

The method of the present invention includes the steps of viewing a distant target with a shooting scope; projecting a beam of laser light on the distant target with a laser targeting device or other source of laser light enabling a spot of laser light to appear thereon; determining or measuring the approximate size of the spot of laser light projected on the distant target by the laser generating means; and determining the relative distance the distant target is from the shooting scope based upon the size and growth rate of the spot measured.

The method may further include the act of firing the weapon on a sight line determined from the relative distance and the inherent projectile drop over the distance to be fired. That is, the present inventive method may also include adjusting the point of aim of the firearm or bow to compensate for the bullet or arrow drop when trying to hit distant targets.

With respect to the shutter embodiment of the system, the method may also include operating a variable shutter between an open and a closed position to measure the size of the spot by opening or closing the shutter until the size of the shutter opening corresponds to the size of the spot.

Of course, with any of the embodiments of the present invention, the system may be configured to measure the radius or diameter of the dot projected, rather than the circumference, because they too will increase as the size of the dot increases. In this manner, the aiming indicia or graph used to accurately approximate the target to shooter distance will be calculated according to the known information.

The invention may also include a heat sensing, infra-red, or light intensifying night vision device such that a target may be acquired at night or in low light. The heat sensing device, for example, will in most cases reveal a heat signature of a mammalian body because the body is often hotter than its surrounding environment.

For example, in areas where night hunting is legal, and the hunter has an alternate embodiment of the invention fitted with a heat sensing device, infrared or night vision device, the hunter may find the game by the detected heat signature or "print", or by the enhanced visibility of the system. The user may then project the spot of laser light on the mammalian target and adjust the line of sight in accordance with the method of the present invention.

It is an object of the present invention to provide the shooter with reliable shooter to target distance information which can be used by the shooter to adjust the sighting plane of a projectile firing device such as a firearm or bow after taking into consideration such factors as projectile drop so that the shooter may become more accurate firing projectiles at distant targets.

These and other objects, advantages, and features of the present invention will become apparent after consideration of the specification, drawings and claims set forth herein. All such additional objects, advantages and features are believed to be within the scope of the present invention, whose only limitation is the scope of the appended claims.

DETAILED DESCRIPTIONS OF THE PREFERRED EMBODIMENT(S)

With reference to FIGS. 1 through 4, the components of an embodiment of the system of the present invention are shown attached to a variety of projectile firing weapons, namely a rifle, a pistol and a bow.

Figures 1, 2, 3, 4, 5:
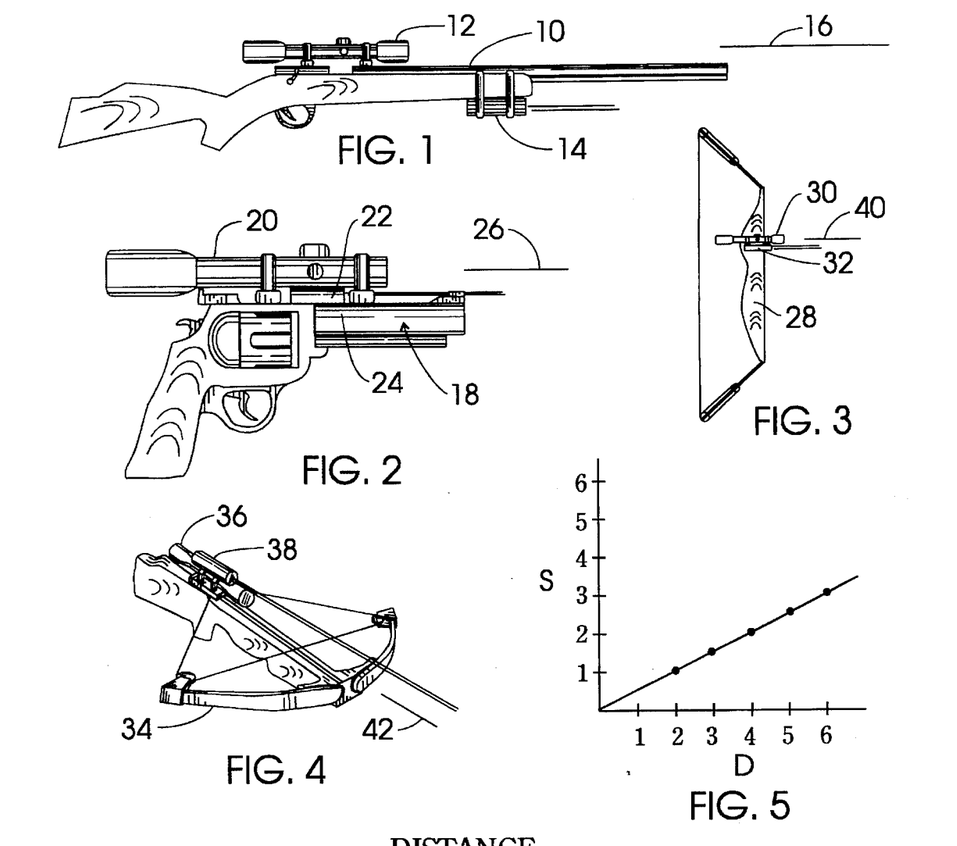
FIG. 1 is a perspective view of a projectile firing rifle outfitted with the laser assisted sighting system and device of the present invention.
FIG. 2 is a perspective view of a projectile firing revolver outfitted with the laser assisted sighting system and device of the present invention.
FIG. 3 is a representational view of a projectile firing compound bow outfitted with the laser assisted sighting system and device of the present invention.
FIG. 4 is a representational view of a projectile firing crossbow outfitted with the laser assisted sighting system and device of the present invention.
FIG. 5 is a representational graph of the growth rate of the laser component of the sighting system of the present invention.

As shown in FIG. 1, rifle 10 has a rifle scope 12 and laser beam projecting device 14 attached thereto. Ideally, the scope 12 and laser device 14 are aligned along and parallel to the reference line 16 such that the dot of laser light that is projected on a distant targeted object can be viewed through the rifle scope 12.

With reference to FIG. 2, a revolver 18 is shown having a handgun scope 20 and a laser beam projecting device 22 mounted to the top surface of the barrel 24. Similar to the description pertaining to FIG. 1 above, the handgun scope 20 and laser beam projecting device 22 are preferably along the same sight line as designated generally by the referenced numeral 26, such that the laser spot appearing upon a distant target can be viewed through the scope 20.

With reference to FIG. 3 a compound bow 28 is shown having a scope component 30 and a laser beam projected component 32 mounted there to. Similarly, as shown in FIG. 4 a crossbow 34 has a crossbow scope 36 and laser beam projecting device 38 attached thereto.

Even though the compound bow 28 and crossbow 34 fire projectiles in the form of an arrow, the principals of the present invention still apply. That is, it is preferable that the sight lines 40 and 42 of FIGS. 3 and 4 respectively are such that the spot of laser light projected by laser beam projecting devices 32 and 38 can be seen through scopes 30 and 36 of the compound bow and crossbow respectively.

With reference to FIG. 5, an example of the linear growth rate of a spot of laser light at varying distances is provided. On the vertical axis, designated by the referenced letter S, is the size of the spot in inches. The range in inches, for this example, is from 1 through 6. On a horizontal axis, designated generally by the reference letter D, is the distance from the laser projecting device to the target as expressed in 100's of yards such that the range in distance is from 100 to 600 yards.

As can be seen in this hypothetical, if the spot of laser light is one inch at 200 yards as determined by the vertical and horizontal placement of the linear line, the size of the laser spot is therefore two inches at 400 yards and three inches at 600 yards.

Accordingly, if one knows the linear growth rate of the laser spot produced by the particular laser generating beam device, as emanating from the laser component of the present invention, and can determine the size of the laser spot as projected on a distant target, one can then determine by reference to a graph or other device or means, as will be disclosed herein, the approximate range or distance the target is away from the targeting system of the present invention.

In order for a shooter of a projectile to place a projectile in the desired target zone, and assuming the user has determined the size of the laser spot and thus the range the target is away from the shooter, the user must know the relative projectile rise or drop over the distance of travel. That is, with reference to FIG. 6, four popular calibers for firearms are listed.

Figure 6:
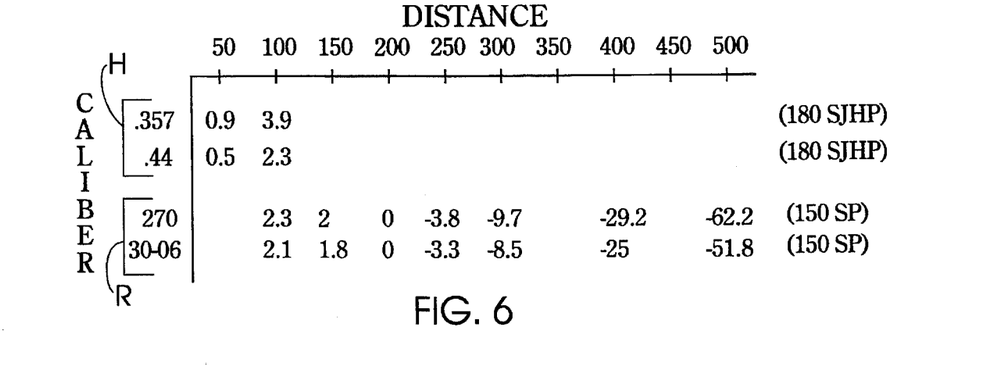
FIG. 6 is graph illustrating the relative projectile drop of common pistol and rifle cartridges.

A similar graphical representation would apply to crossbows and compound bows but such is not provided here. As seen in FIG. 6, with respect to handgun calibers designated generally by their bracket indicated by the referenced letter H, a 0.357 magnum caliber or a 0.44 magnum caliber are shown.

As can be seen from the table, which is extracted from Remington Arms Company ballistic data published in the 1993 copy of *The Shooter's Bible,* it can be seen at 50 yards there is a bullet deviation of 0.9 inches with a 0.357 magnum and 0.5 inches for the 0.44 magnum. At 100 yards the bullet deviation off the sight line is 3.9 inches for the 0.357 caliber and 2.3 inches for the 0.44 caliber. As noted on the chart, the same size, weight, and style projectile, a 180 grain semi jacketed hollow point, was used.

With reference to the rifle calibers as designated by the referenced letter R and bracketed accordingly, is shown a 0.270 caliber and a 30-06 caliber. As noted on the chart, the same size, weight and style bullet, namely a 150 grain soft point CORE-L()KT® Remington bullet was used. At 100 yards the 270 caliber rose 2.3 inches and the 30-0,6 caliber rose 2.1 inches. Both calibers were sighted at 200 yards as indicated by the zeros. At a distant range of 500 yards the 270 caliber bullet dropped 62.2 inches and the 30-06 dropped 51.8 inches.

Therefore, if the user knows the respective bullet drop or rise for a particular firearm cartridge and takes into consideration the specific firearm used to fire the cartridge, or projectile in the case of crossbows, the user can compensate for the off target shot by changing the point of aim.

Accordingly, as described above, if the shooter can determine the relative distance by measuring the approximate size of the spot of laser light as determined by its linear growth, and knows the activity of the bullet or projectile, whether it be a rise or fall over the given known distance, the user then may, with a high degree of accuracy, compensate for the off-line shot by raising or lowering the point of aim the prescribed distance and therefore the place the projectile into the target area with extreme consistency.

Figure 7A:
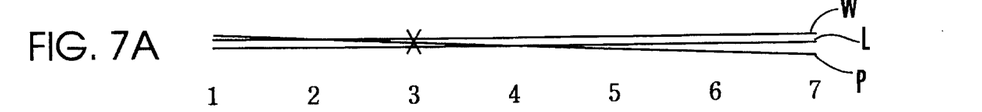
FIGS. 7A through 7C are representational views of sight lines, laser lines, and projectile path lines shown in relative orientation to one another and relating to the principals of the present invention.
Figure 7B:
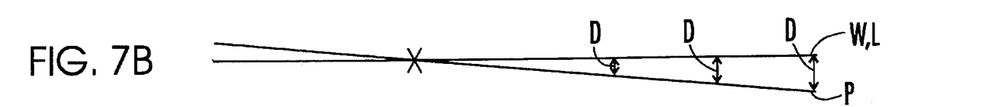
Figure 7C:
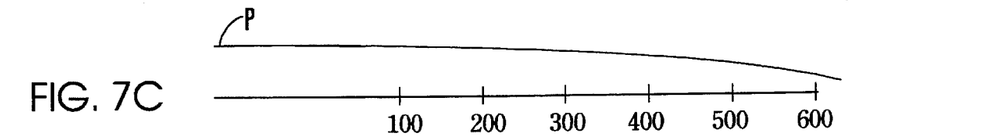

With reference to FIGS. 7A through 7C the above-described phenomenon is illustrated graphically with a series of sight lines, As shown in FIG. 7A, the sight line for the weapon is designated generally by the referenced letter W and sight line for the laser is designated generally by the referenced letter L. The two sight-lines are parallel as they should be in order for the weapon outfitted with the scope to be capable of viewing the laser at a prescribed distance.

As referenced in FIGS. 7A and 7B the projectile path is designated generally by the referenced letter P shown in exaggerated form in the Figures. The numbers on the horizontal scale correspond to hundreds of yards and are provided merely as an example. The zeroed point of the projectile is 300 yards. 300 yards will correspond predominantly to firearms as crossbows and compound bows have a much shorter zero sight distance which is often in the range of 50 to 100 yards.

Therefore, for example, it is seen that the projectile rise occurs in the first 300 yards and thereafter the projectile begins to drop significantly. As can be shown by the arrows in FIGS. 7B as the distance increases the size of the drop generally increases as well. The drop is indicated generally by the referenced letter D, and the drop is usually not linear as it is typically a function of energy loss, bullet weight and configuration, etc.

Figure 8A:
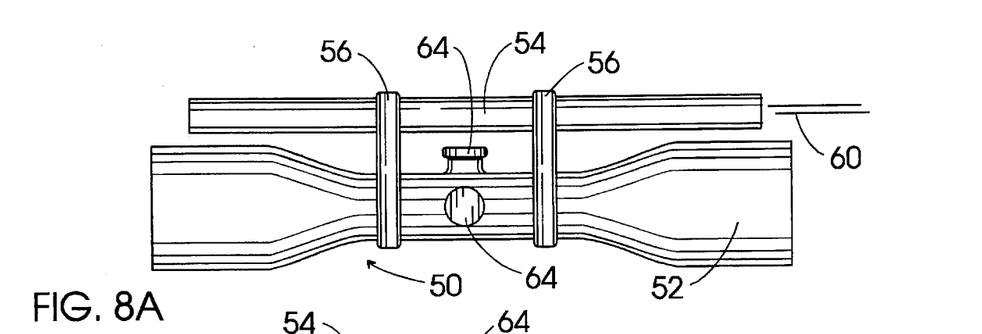
FIGS. 8A and 8B are embodiments of the laser assisted sighting system and device of the present invention.
Figure 8B:
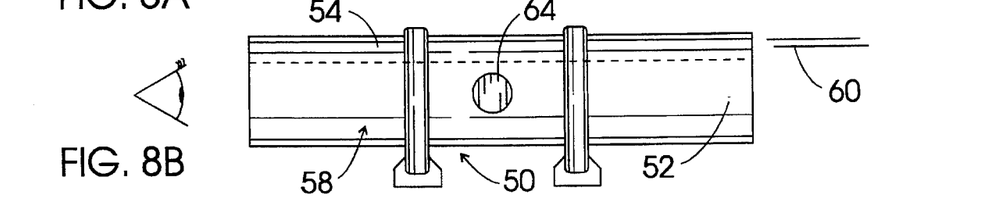
Figure 9:
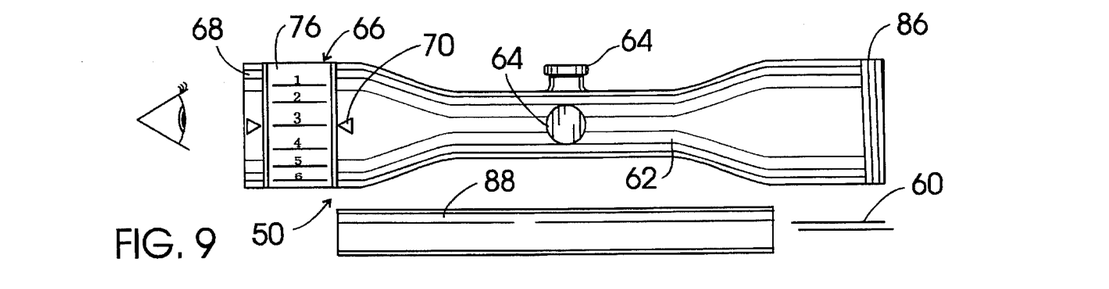
FIG. 9 is an alternate embodiment of the embodiment shown in FIG. 8A.

With reference to FIGS. 8A–8B and 9, the components of an embodiment of the present invention are collectively and generally designated by the reference numeral 50. Inventive components 50 are illustrated in various forms and thus comprise separate embodiments as suggested in FIGS. 8A, 8B and 9.

With reference to FIGS. 8A and 8B a shooting scope 52 is outfitted with a laser beam projecting component 54. In FIG. 8A the connection is accomplished through attachment rings 56 or other suitable means of attachment capable of securing one to the other. In FIG. 8B the attachment is internal as both pertain to the same housing designated generally by the reference numeral 58. In addition, the housing 58 may also incorporate a heat sensing device.

As is suggested by FIGS. 8A, 8B and 9, the sight line for the scope component and the laser beam projectile component are parallel such that the spot of laser light generated by the beam 60 can be seen through the scope component.

With reference to FIG. 9 scope 62 has adjustment knobs 64 similar to those shown in FIGS. 8A and 8B and designated as 64, and also includes a shutter assembly 66. The shutter assembly 66 is aligned near the eyepiece and 68 of the scope 62. Pointers 70 reference the yardage at which the spot of laser light is measured.

Figure 10A:
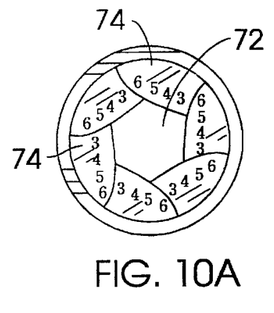
FIGS. 10A and 10B illustrate and embodiment of the shutter component of an alternate embodiment of the present invention.

As viewed in conjunction with FIG. 10A, the shutter has internal aperture 72 which is variable in size by shade elements 74. Shade elements 74 interlock and overlap one another such that the size of the aperture 72 varies in accordance with the directional rotation of the ring 76 as seen in FIG. 9. When the ring 76 is rotated as is shown in FIG. 9 such that pointers 70 align with the indicia indicating 300 yards, the aperture is sized as shown in FIG. 10A.

Figure 10B:
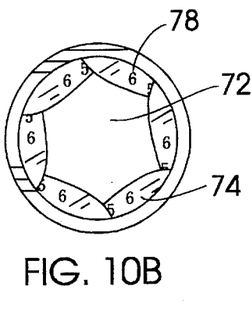

With reference to FIG. 10B, if the ring was continuously rotated in a counterclockwise direction until the pointers would align with the ring in a fashion such that it is slightly past the numeral five, the aperture 72 would be sized larger (FIG. 10B). Shades 74 will overlap the indicia 78 mark thereon indicating that based upon the size of the laser dot assuming, of course, it is correlated to the opening and closing of the aperture, thereby suggesting that the target is slightly over 500 yards away.

Figure 11:
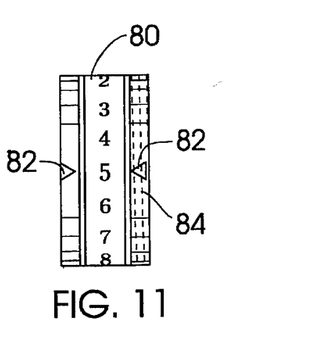
FIG. 11 is a side view of the shutter shown in FIGS. 10A and 10B.

With reference to FIG. 11, viewed in conjunction to FIGS. 10A and 10B, as the ring 80 is rotated in a clockwise or counterclockwise direction such that the pointers 82 of FIG. 11 align with FIG. 5 the indicia on the shades (not shown) but depicted in FIG. 10B can be read on the opening face of either the eyepiece or as in FIG. 11 in the cap configuration. That is, the cap configuration shown in FIG. 11 as its internal threads 84 as referenced by the dashed lines which correspond and engage the external threads 86 of the end of the scope. In this fashion, the user threads the shutter means on the end of a scope configured to receive such a shutter and peers through the eyepiece of the scope.

Figure 12A:
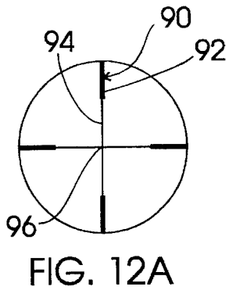
FIG. 12A through 12D are various embodiments of indicia as seen through the eyepiece of a shooting scope.

With reference to FIGS. 12A through 12D, various sighting indicia is shown as would be seen through the eyepiece of the scope components of the apparatus 50. FIG. 12A illustrates reticles 90 having short posts 92 and cross hairs 94 used in conjunction therewith. The intersection of the horizontal and vertical crosshairs is provided as the "dead on" zeroed targeting accuracy position 96.

Figure 12B:
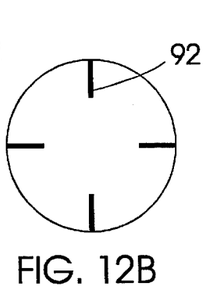
Figure 12C:
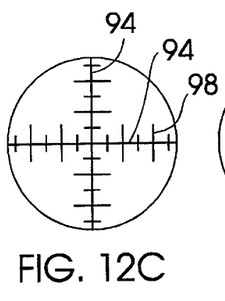

With reference to FIG. 12B posts 92 are present but the crosshairs are absent. With reference to FIG. 12C the somewhat complex set of indicia utilizing crosshairs 94 and hash marks 98 are used to align the scope and the projectile firing apparatus to which it is attached to as to be targeted at the user's discretion.

Figure 12D:
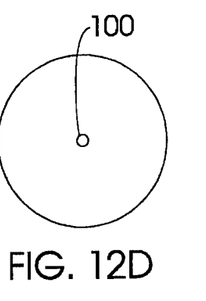

As will be discussed herein below, the hashmarks may be used for other purposes as well. With reference to FIG. 12D, a sighting dot 100 is provided. Dot 100 is placed on the zero targeting point the "dead on" zero targeting point and intended projectile striking position on the target when it is visually placed on the desired impact part of target. As will be shown below at various distances the impact point may be above or below the actual sighting point and therefore the range finding capabilities of the present invention enable the above or below distance (i.e., projectile rise or drop) to be determined with extreme accuracy.

Figure 13A:
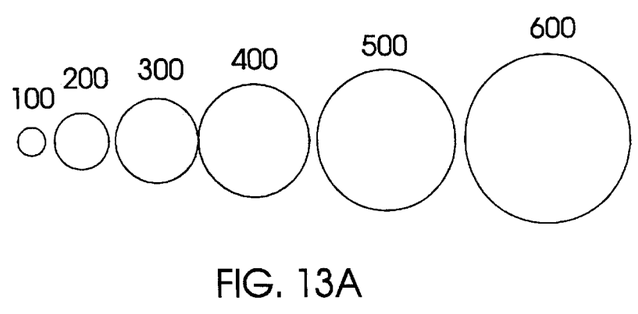
FIGS. 13A and 13B are representational illustrations of the relative size of the laser dot as projected at varying distances.
Figure 13B:
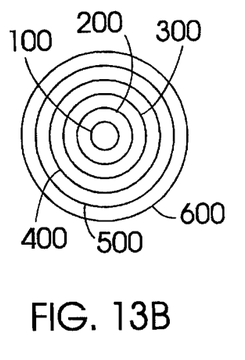

With reference to FIGS. 13A and 13B, various sizes of laser dots are shown representationally to illustrate the growth of a laser dot on a linear scale from 100 to 600 yards. With reference to FIG. 13B the circle embodiment of the indicia incorporates concentric and linearly spaced circles to enable easier measurement of the size of the spot.

Figure 14:
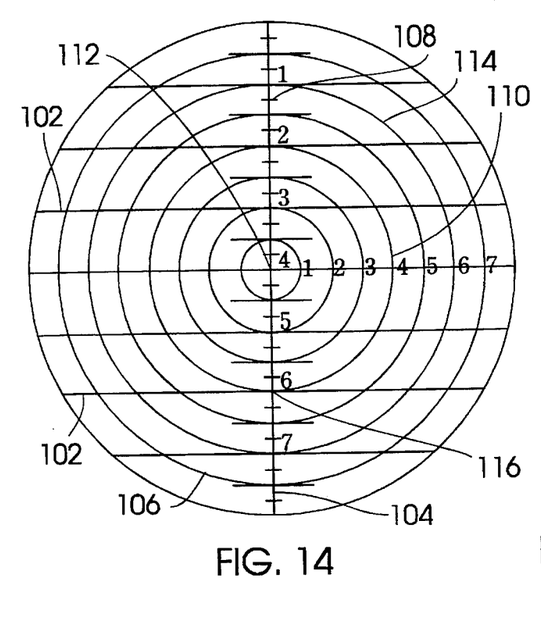
FIG. 14 is a representational view of the indicia of the preferred embodiment of the present invention as seen through the eyepiece of the shooting scope.

With reference to FIG. 14 the preferred embodiment of the indicia used in conjunction with the present invention is shown. Crosshairs 102 and 104 are shown vertically and horizontally respectively. Circles 106 are provided as a means to measure the size of the laser spot as illustrated in FIGS. 13A and 13B. Hashmarks 108 having numeric indicia are shown as a reference means for determining the amount of projectile rise or drop.

In use, the laser component of the present invention projects a spot of laser light on a target. If, for example, the spot fills the number 4 ring 110 as viewed on the horizontal scale of crosshairs 102, and assuming that the growth rate of the laser corresponds with the size of the rings such that the scope indicia is correlated as relating to and corresponding with the growth rate of the particular laser, the user knows that the distant target on which the laser spot is projected is 400 yards away. The center intersection 112 is used to target the projectile. That is, intersection 112 is placed on the desire point of impact for the projectile period.

Similarly, if the spot fills the six ring 114, the user then knows the target is approximately 600 yards away and uses the intersection designated as six on the vertical scale 116 is the intended striking point and hence point of aim of the projectile to be fired. As can be shown between the two examples, the user must raise the projectile firing apparatus, such as a firearm, above the normal site line for the 400 yard shot when making the 600 yard shot. This elevation accounts for the bullet drop over the extra travel distance of 200 yards beyond the zeroed sighting. In such a fashion, the projectile is allowed to strike with greater accuracy than simply estimating the yardage distances, as well as the bullet drop or rise.

Figure 15A:
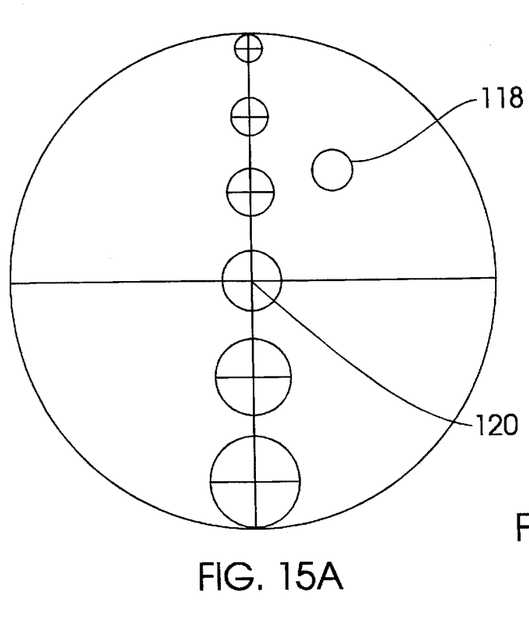
FIGS. 15A through 15D are alternate embodiments of the indicia used to size the laser dot at varying distances as used in accordance with the principals of the present invention.

With reference to FIGS. 15A through 15D, alternate embodiments of the indicia are shown. In FIG. 15A, for example, the laser spot 118 appears sized in accordance with the approximate size of the circle 118, it then corresponds to a range of between 200 and 300 yards. If the shooter then assumes that the target is approximately 225 yards away, he may then adjust the center central intersection point 120 to visually determine the distance above or below the attended point of impact prior to firing the projectile to rise or drop over the distance of travel.

Figures 15B, 15C:
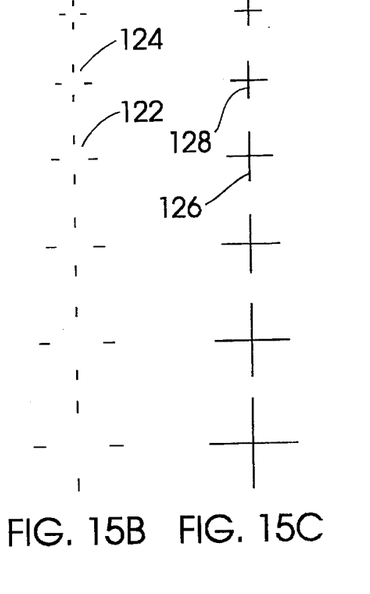
Figure 15D:
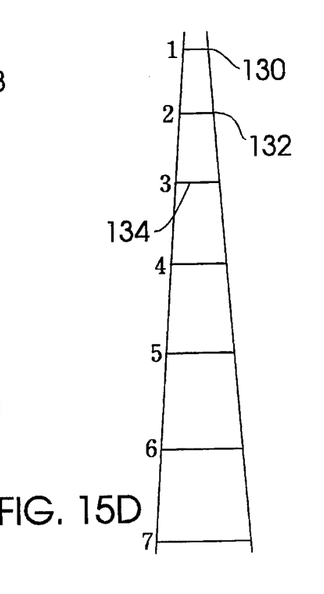

Similarly, the indicia shown in 15B, 15C, and 15D are used in approximately the same fashion such that the size of the laser spot is compared to the indicia shown as 122 and 124, 126 and 128, 130 and 132 in those Figures. The latter embodiment shown in FIG. 15D provides a simplified diameter measuring the system such that the circumference of a laser spot is not measured but the diameter is by the horizontal crossbars 134. When the horizontal crossbars approximate the diameter of the projected laser spot the approximate size of the spot is then determined and the approximate distance in hundreds of yards can be read off of the vertical scale of the ladder embodiment.

MODE OF OPERATION

Reference will be made to the following example as the facts apply to fixed and variable power scopes contained in the discussion set forth below. For example, if a deer is viewed with the naked eye at one hundred yards the deer will have an associated size. If the same deer is viewed at two hundred yards the deer will appear smaller to the naked eye.

If a spot of laser light was projected from a laser light device and was incident on a tree at one hundreds yards the spot will have an associated actual size A, and appear to have a size B when viewed through the naked eye. Similarly, if the same beam were used to project a spot of laser light on a tree at two hundred yards, it would have an actual size such C (e.g., 2A if the growth rate is A per hundred yards.) and the size of the spot at two hundred yards when viewed through the naked eye would have yet another size D. Size D does not necessarily relate to size A at all, for the same reason that the size of the spot depends on the collimation of the beam. That is, in some instances the actual size of the spot at two hundred yards may be 0.2A, 1.5A, 5A, etc.

With reference to the facts of the deer and laser spot example set forth above, and using an laser spot with actual size A at one hundred yards and 1.5A at two hundred yards, etc., consider the following:

Fixed Power Scopes

If a hunter were to see the aforementioned deer at an unknown distance in a forest with the naked eye, he may then raise his weapon and peer through the scope. The deer would appear larger in the viewfinder of the scope because of the scope magnification. The size of the deer, when viewed through the scope, can be referred to as X. The hunter could then project the laser spot on the deer's body or a tree nearest to the place where the deer is standing. The spot would then have a size B when viewed through the scope. If the size B of the spot, as viewed through the scope, matched up with the pre-calibrated indicia corresponding to one hundred yards, the hunter could adjust his point of aim to allow for bullet drop or rise.

If the deer suddenly walked off out of view, as they often do while deer hunting, and knowing the direction the deer walked off, the hunter may then aim the laser spot at a tree where he thinks the deer will appear again. Through the scope, the size of the spot is C. The size of the spot might be smaller, larger or the same size as B depending upon the association between the magnification of the scope and the collimation of the laser beam. The indicia would still be useful because the components, riflescope and laser beam generating device are calibrated or "mated" components in that their relationship is known. That is, the magnification what is viewed through the scope is constant, and the growth rate of the laser beam is also constant, and the scope indicia corresponds to the relationship of those two constants. When the distance is determined, the hunter can then be prepared to adjust for projectile drop or rise before the target (i.e., deer) comes back into view.

For example, if the new spot size C equalled B the same indicia used for the one hundred yard determination would yield a two hundred yard reading. If the size of the spot C were larger than B, the indicia larger than B would be used as it would have been calibrated to correspond two hundred yards. Similarly, if the size of the spot C is smaller, the indicia corresponding to a two hundred yards distance would again be used. The calibration of the indicia would be different in each of the three mentioned examples would therefore differ if the relationship between scope magnification and beam growth rate is not constant between the three examples.

Variable Power Scopes

If the power setting of a variable power scope was set at a preselected magnification level and left at that preselected power when the indicia is calibrated to account for the relationship between the growth rate of the laser and scope magnification, the invention would work in much the same manner as described above with respect to a fixed power scope.

If for example, the power was increased by a factor of two, the size of the images in the above example, the deer and the laser spot, would also increase by a factor of two. The indicia would then require recalibration or a factor of two applied to the existing indicia such that the hunter would then use different indicia depending upon the magnification factor.

Shooting accuracy and comfort is believed by many to be enhanced when, for example, the size of the target (e.g., deer) is constant at any yardage. To achieve this, the hunter must adjust the magnification of the scope. So long as the laser collimation factor is known, and the magnification is known even if it is changed, the hunter can use the invention to achieve consistent shot accuracy and comfort when viewing an intended target.

Furthermore, it may be desirable to increase the power of the scope allowing the size of the laser spot to increase in order to make it more easily visible and measurable, understanding that the increase in spot size would correspond to the increase in magnification, and not a change in collimation. Of course, it is contemplated that a change in collimation would accomplish essentially the same result in this instance.

In either case, the hunter may consistently use the indicia associated with a single bar, line, crosshatch, circle, or any other suitable marking.

If, on the other hand, the beam were tightly collimated to retain its diameter at varying distances, the association and correspondence to a collimated beam and the magnification of the scope would still need to be calibrated as set forth by the indicia of the invention, but the calibration would be somewhat easier. With respect to the fixed power scope embodiment, and the laser spot has a size B at one hundred and two hundred yards, the spot would appear smaller in the viewfinder of the scope in much the same manner as that described above. With respect to a variable power scope, the size of the spot could be changed by adjusting the magnification of the scope in the much the same manner as described above.

It will become apparent that these and other embodiments of the present invention are within the intended scope of the invention, whose only limitation is the appended claims.

What is claimed is:

1. A laser assisted telescopic targeting device, comprising:
   a shooting scope;
   laser means, positioned substantially parallel to the shooting scope for projecting a beam of laser light toward a target enabling a spot of laser light to appear thereon and remain within a field of view associated with the shooting scope; and
   sizing means for determining the approximate size of the spot of laser light: as viewed through the shooting scope and projected on the target by the laser means enabling a user to determine the relative distance the spot of laser light is from the laser means.

2. The device of claim 1, wherein:
   the sizing means is configured to enable the user to adjust the point of aim of the projectile firing weapon to maximize the accuracy of the user of the projectile firing weapon.

3. The laser assisted targeting device of claim 1, wherein the sizing means further includes:
   indicia associated with the shooting scope.

4. A laser assisted targeting device, comprising:
   a shooting scope;
   laser means for projecting a beam of laser light toward a target enabling a spot of laser light to appear thereon; and
   sizing means for determining the approximate size of the spot of laser light projected on the target by the laser means enabling a user to determine the relative distance the spot of laser light is from the laser means; and
   wherein the sizing means further includes shutter means having an aperture variable in size for measuring the size of the spot of laser light projected on the target by the laser means.

5. The laser assisted targeting device of claim 1, wherein:
   the shooting scope is selected from the group of shooting scopes consisting of handgun scopes, riflescopes, archery scopes, and crossbow scopes.

6. The laser assisted targeting device of claim 3 wherein:
   the indicia is selected from the group consisting of reticles, circles, crosshairs, dots, and lines.

7. The laser assisted targeting device of claim 3, wherein:
   the indicia is provided to determine the size of the spot of laser light on the target and provide various sight lines.

8. The laser assisted targeting device of claim 1, wherein:
   the shooting scope and laser means are contained within a single housing.

9. The laser assisted targeting device of claim 1, further including:
   a projectile firing weapon.

10. A laser assisted telescopic point of aim system, comprising:
    scope means for viewing a target along a sight line;
    laser means for generating a beam of laser light incident upon the target and substantially parallel with the sight line enabling a spot of laser light to appear on the target, and remain within a field of view associated with the scope means; and
    means for measuring the approximate size of the spot of laser light incident upon the target as viewed through the scope means and enabling the user to determine the approximate distance the scope means is from the target by reference to known growth data of the laser means.

11. The system of claim 10, wherein:
    the system if further configured to enable the user to adjust the point of aim of a projectile firing weapon to increase the accuracy of a fired projectile.

12. The laser assisted point of aim system of claim 10, wherein the means for measuring includes:
    indicia associated with the shooting scope.

13. A laser assisted point of aim system, comprising:
    scope means for viewing a target;
    laser means for generating a beam of laser light incident upon the target: enabling a spot of laser light to appear thereon; and
    means for measuring the approximate size of the spot of laser light incident upon the target enabling the user to determine the approximate distance the scope means is from the target by reference to known growth data of the laser means; and
    wherein the means for measuring further includes a shutter.

14. The laser assisted point of aim system of claim 10, wherein:
    the scope means is a shooting scope selected from the group of shooting scopes consisting of handgun scopes, riflescopes, archery scopes, and crossbow scopes.

15. The laser assisted point of aim system of claim 10, wherein:
    the indicia is selected from the group consisting of reticles, circles, crosshairs, dots, and lines.

16. The laser assisted point of aim system of claim 10, wherein:
    the scope means and laser means are separate components.

17. The laser assisted point of aim system of claim 13, wherein:

the scope means and the laser means are contained within a single housing.

18. The laser assisted point of aim system of claim 10, further including:

heat sensing means for detecting the presence of a mammalian target.

19. A method of aiming a projectile firing weapon, including the steps of: viewing a target along a sight line with a shooting scope;

positioning a source of laser light substantially parallel to the shooting scope projecting a beam of laser light on the target and substantially parallel with the sight line enabling a spot of laser light to appear thereon, and remain within a field of view associated with the shooting scope;

determining the approximate size of the spot of laser light projected on the target as viewed through the shooting scope; and determining the relative distance to the target based upon the size of the spot and the growth rate of the beam of laser light projected by reference to know growth data of the spot of laser light.

20. The method of claim 19, including the step of:

adjusting the line of sight of a projectile firing weapon in response to the determined distance.

21. A method of aiming a projectile firing weapon, including the steps of:

viewing a target with a shooting scope;

projecting a beam of laser light on the target enabling a spot of laser light to appear thereon;

determining the approximate size of the spot of laser light projected on the target; and determining the relative distance to the target based upon the size of the spot and the growth rate of the beam of laser light projected by reference to known growth data of the spot of laser light at varying distances; and operating a variable shutter between an open and a closed position to measure the size of the spot.

22. The method of claim 19, wherein the step of determining the approximate size further includes:

comparing the size of the spot to predetermined indicia visible through the shooting scope.

* * * * *